United States Patent [19]

Cascionale et al.

[11] Patent Number: 5,620,385
[45] Date of Patent: Apr. 15, 1997

[54] TENSIONERS FOR DRIVING BELTS

[75] Inventors: Paolo Cascionale, Pescara; Luigi Celio, Palena; Luigi Laviola, Rome; Alberto Ruffini, Brecciarola, all of Italy

[73] Assignee: Dayco PTI S.p.A., Chieti Scalo, Italy

[21] Appl. No.: 547,795

[22] Filed: Oct. 25, 1995

[30] Foreign Application Priority Data

Oct. 28, 1994 [IT] Italy .................. MI9402215

[51] Int. Cl.$^6$ ........................................ F16H 7/10
[52] U.S. Cl. ........................... 474/112; 474/135
[58] Field of Search .......................... 474/101, 112, 474/133–135

[56] References Cited

U.S. PATENT DOCUMENTS

| Re. 34,543 | 2/1994 | Komorowski | 474/112 X |
|---|---|---|---|
| 4,473,362 | 9/1984 | Thomey et al. | 474/135 |
| 4,596,538 | 6/1986 | Henderson | 474/135 |
| 4,826,471 | 5/1989 | Ushio | 474/135 |
| 4,846,446 | 7/1989 | Peppel | 474/134 X |
| 4,904,230 | 2/1990 | Kawashima et al. | 474/112 |
| 4,917,655 | 4/1990 | Martin | 474/112 |
| 4,971,589 | 11/1990 | Sidwell et al. | 474/135 |
| 5,256,112 | 10/1993 | Thomey et al. | 474/112 |
| 5,266,067 | 11/1993 | Gapco | 474/112 |

FOREIGN PATENT DOCUMENTS 4300178  4/1994  Germany .

*Primary Examiner*—Roger J. Schoeppel
*Attorney, Agent, or Firm*—Watson Cole Stevens Davis

[57] ABSTRACT

A tensioner for belts including a stationary structure (3), an arm (4) movable with respect to a shaft (7) of the stationary structure, a torsion spring (6), a pair of dampening cones (8), (9) associated with the stationary structure and the arm, a compression spring (10) acting on the dampening cones. The mean radius of the cones is smaller than the maximum radial dimension of the torsion spring. The value "1" of the arm is correlated to the mean radius of the cones determining a frictional dampening between the cones smaller than that existing between the shaft and the rotating arm.

21 Claims, 2 Drawing Sheets

TENSIONERS FOR DRIVING BELTS

BACKGROUND OF THE INVENTION

The present invention relates to improvements to tensioners used in power transmissions which comprise a belt and at least two pulleys, that is a driving pulley and a driven pulley, respectively.

In such power transmissions, the tensioner acts with its pulley on the back of the belt to tension it to a value that assures normal working of the power transmissions.

It is known to use a tensioner for driving belts which comprise a stationary structure, a lever arm supported by the stationary structure and movable with respect to the latter, a pulley associated with the arm, a first mechanical or torsion spring means between the stationary structure and the arm to move the arm with respect to the stationary structure and to urge the pulley against the belt, frictional dampening means associated with the stationary structure and the arm to dampen the movements of the arm rotating with respect to the stationary structure in both rotation directions. The stationary structure comprises a shaft having a longitudinal axis mounted in a stationary manner with respect to the movements of the rotating arm and the arm has a portion carried by the shaft so as to rotate relative thereto.

A tensioner as set forth above is described in greater detail in U.S. Pat. No. 4,473,362, the disclosure of which is hereby incorporated by reference.

The tensioner of U.S. Pat. No. 4,473,362 is provided with a torsion spring having at the ends thereof a rotating arm and a stationary structure and a plastic spring holder ring with cylindrical walls and supported by the lower portion of the stationary structure coaxially to the shaft. The lever arm lengthens considerably starting from the tensioner shaft over its radial path which is determined by the torsion spring and carries at its free end an idle pulley.

During operation one end of the torsion spring for the rotation of the lever arm is clamped on the lateral wall of the spring holder element which is urged against rotating parts of the tensioner giving rise to a frictional dampening.

In this tensioner the dampening is proportional to the force of the torsion spring.

Tensioners having the above mentioned characteristics are known, in which however the dampening has constant values independently of the values of the forces of the mechanical spring means that urge the tensioner pulley towards the belt.

Such a tensioner is described in the U.S. Pat. No. 4,596,538 the disclosure of which is hereby incorporated by reference.

In this tensioner, a flat torsion spring wound coaxially to the shaft is arranged in a first plane and a dampening device, formed by two plates opposite to each other and second mechanical spring means, is arranged in a second plane lying below the first plane.

One of the plates is mounted coaxially to the shaft, rotates with the arm and is axially movable relative to the second plate integral with the stationary structure.

The second spring means comprises a wavy spring that urges one of the plates against the other to determine the desired frictional value during the rotation of the arm and to compensate for wear appearing in the form of dust due to the friction between the plates.

The tensioner arm extends considerably over the radial encumbrance of the flat torsion spring and the underlying damper and carries at its end an idle pulley for tensioning the belt.

A further tensioner having a constant frictional dampening is described in U.S. Pat. No. 4,971,589 the disclosure of which is hereby incorporated by reference. This tensioner provides a flat torsion spring wound coaxially to the shaft and on the shaft itself.

The stationary structure provides a cup-shaped envelope having a base to which the shaft is secured and lateral walls ending in an outwardly flaring shaped with a conical surface portion having an inclination converging towards the shaft. The arm has a conical surface complementary to that of the envelope. A layer of suitable anti-friction material is arranged between the two conical surfaces. The second mechanical means is represented by a wavy spring that, from the tensioner upper part, urges the conical surface of the arm against that of the envelope.

The conical surfaces are adopted to oppose a "cocking" phenomena, i.e. the inclination of the tubular portion of the arm on the shaft. Such "cocking" is due to the fact that the horizontal force transmitted by the belt to the pulley is applied at a certain distance from the lower portion to which the shaft is secured thus originating a bending moment with a resulting inclination and a consequent wear of the anti-friction material layer between the shaft and the portion of the arm rotating around the shaft. In this tensioner the dampening is determined by the friction due to the movements relating to the rotation between said conical surfaces at the periphery of the envelope and assumes high values due to the sensible mean radius of the conical surfaces measured with regard to the axis of the shaft.

A further tensioner is known from U.S. Pat. No. 4,826,471, the disclosure of which is hereby incorporated by reference, which comprises first mechanical spring means formed by a torsion helical spring mounted coaxially to the shaft between the arm and the stationary structure.

This tensioner makes use of a dampening device comprising two cams having inclined surfaces cooperating with each other and second mechanical spring means formed by a compression spring. One of the cams is mounted on the lower base of the arm and the second cam having an inclined surface directed towards the first inclined surface is mounted coaxially to the shaft on which it can slide only axially through a guide which is longitudinally notched to the shaft.

The second cam is urged against the first one by the compression spring disposed with its lower end on a stationary base, coaxially to the shaft and inside the torsion spring. The arm lengthens over an envelope of space defined by the two springs.

During operation, in relation to a predetermined direction of rotation of the arm, one of the cams goes up with its inclined surface towards the other one, compressing the spring which when unloading its force obliges the cam to go down towards the other one with a movement of the arm against the back of the belt.

In practice, in this tensioner the torsion spring and the compression spring act as they were in parallel to tension the belt. The working of the dampening device is unidirectional. The tensioners of the state of the art set forth above also have a dampening effect independent of the dampening device. This independent dampening is due to the friction between the shaft and the portion of the arm in rotation around the shaft since the force of the belt acting on the pulley at the end of the arm is balanced by an equal and opposite reaction directed by the portion of the arm in rotation around the shaft towards the shaft.

Consequently, the tensioners of the state of the art provide a dampening, even if minimal, due to the essential structural parts and additional dampening devices that can be grouped in two types different from each other that is, a first type in which the dampening can depend on the force of the spring or also unidirectionally and a second type in which the friction is constant for both the directions of rotation of the arm.

The present invention includes dampening devices of the second type.

The tensioners provided with devices of the second type have in several of their embodiments frictional surfaces exposed to the outside with the possible risk of embedding particles of the surrounding environment and consequent risk of jamming.

Moreover said tensioner are based on dampening devices which substantially make use of very large frictional surfaces and heavy compression loads with a consequent and not indifferent wear-in time with formation of dust and risks of jamming between the frictional surfaces in the relative rotary motion.

SUMMARY OF THE INVENTION

The Applicant has found that it is possible to improve the tensioners of the state of the art with reference to the regularity of working, its lifetime, as well as resistance to "cocking" by making use of a dampening unit comprising opposed conical surfaces, subjected to pressure between them by mechanical spring means and by linking the frictional dampening percentage obtainable from said unit to that obtainable from the friction produced between the surfaces of the tensioner stationary shaft and the tensioner arm rotating around said shaft.

More particularly, it was found that it is possible to achieve the desired improvements when the value of the arm measured between the centers of the shaft and the pulley acting on the belt and the value of the mean radius of the conical surfaces are correlated to each other in a predetermined manner to control when the arm rotates relative to the stationary structure with a frictional dampening between the conical surfaces being sensibly smaller than the frictional dampening between the shaft and the arm portion carried by the shaft, for example a dampening of between 15% and 40%, also for example a dampening of 20% of the total dampening.

Therefore an object of the present invention is a tensioner for driving belts comprising a stationary structure, a lever arm carried by said stationary structure and movable relative to said stationary structure, a pulley associated with the arm, first mechanical spring means associated with the stationary structure and the arm to move the arm with respect to the stationary structure and to urge the pulley on the belt. The present invention also includes frictional dampening means associated with the stationary structure and the arm to dampen the movements of the arm rotating with respect to the stationary structure in both rotation directions, said stationary structure comprising a shaft having a longitudinal axis and being mounted in a stationary manner relative to the movements of the rotating arm, said arm having a portion carried by the shaft so as to rotate with respect to the shaft, said tensioner being characterized by the fact that:

a) said dampening means comprises a pair of annular elements provided with first and second conical surfaces, and second mechanical compression spring means, said first surface comprising frictional means and being mounted coaxially to the shaft and axially movable with respect thereto as regards the second surface, said second spring means biasing the conical surfaces toward each other and into contact under pressure, said conical surfaces having a mean radius smaller than the maximum radial dimension of the first mechanical torsion spring means;

b) the length values (1) of the arm between the centers of the shaft and the pulley and the mean radius values (Rm) of the conical surfaces are correlated between them in a predetermined manner to produce when the arm rotates relative to the stationary structure, a frictional dampening between the conical surfaces smaller than the frictional dampening occurring between the shaft and the portion of the arm carried by the shaft.

Hereinafter the value of the mean radius Rm of the conical surfaces is the value that for a determinate height h of the conical surface is measured at half height.

Preferably the tensioner is characterized by the fact that the ratio between the length of the arm and the mean radius Rm of the conical surfaces is comprised between 0.1 and 0.5.

Also preferably, the tensioner is characterized by the fact that the arm comprises a cylinder mounted in an eccentric manner with respect to the longitudinal axis of the shaft, said pulley being mounted in freely rotatable manner on said cylinder by means of a suitable bearing.

In some particularly advantageous embodiments, the tensioner is characterized by the fact that in an axial section of the tensioner the angle $\beta$ (FIG. 6) between the line of the conical surface in the axial plane and the longitudinal axis of the shaft is comprised between 20 and 70 degrees.

In a preferred embodiment the tensioner comprises means for connection to the rotation and contemporaneously means to guide the axial movement between the element comprising the first conical surface and the arm.

The two conical annular elements can be made of plastic material or metallic material, for instance a bronze and brass alloy or of polyamide.

In particular and preferably, the invention uses an annular element of bronze alloy axially movable along the shaft and confronting a stationary annular element of plastic material having fibers embedded therein, for example aromatic polyamide fibers; it is possible to use two annular elements, both of plastic material.

Alternatively to the previous solution, the annular element having a conical surface, for example of bronze alloy, could be mounted on the stationary structure with ways for axial sliding along which said annular element is urged by a compression spring against a further annular element having a complementary conical surface fixed to the lever arm.

Further characteristics and advantages will better appear from the detailed description of a preferred, but not exclusive, embodiment of a tensioner for driving belts according to the present invention.

BRIEF DESCRIPTION OF THE DRAWINGS

Description will be made with reference to the attached sheets of drawing, supplied only by way of non limiting example, wherein.

DETAILED DESCRIPTION OF A PREFERRED EMBODIMENT

Figure 1:
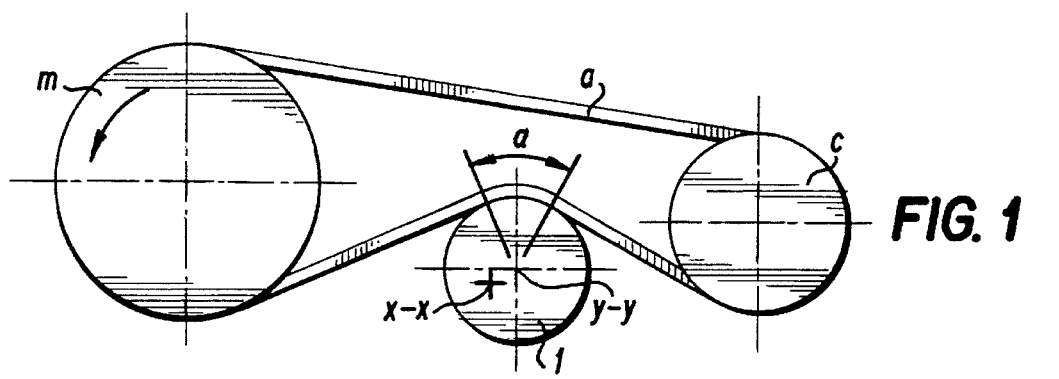
FIG. 1 is a diagrammatic view of a power transmission provided with a flexible belt and a related tensioner.

FIG. 1 shows a flexible belt "a" in a driving device provided with two pulleys, a driving pulley "m" and a driven pulley "c", respectively.

The belt of FIG. 1 is represented for the sake of simplicity only by its longitudinal development; the belt can be of any known type, for example a motor vehicle toothed timing belt of elastomeric material as used in an internal-combustion engine for the control of the camshaft.

Further, FIG. 1 represents diagrammatically by a circle the pulley of the tensioner 1 having a rotation center Y, which is mounted on a support having a center X. The features of the tensioner forming the object of the present application are described later, illustrated in general in FIG. 2 and more in detail in FIGS. 3–7.

Figure 2:
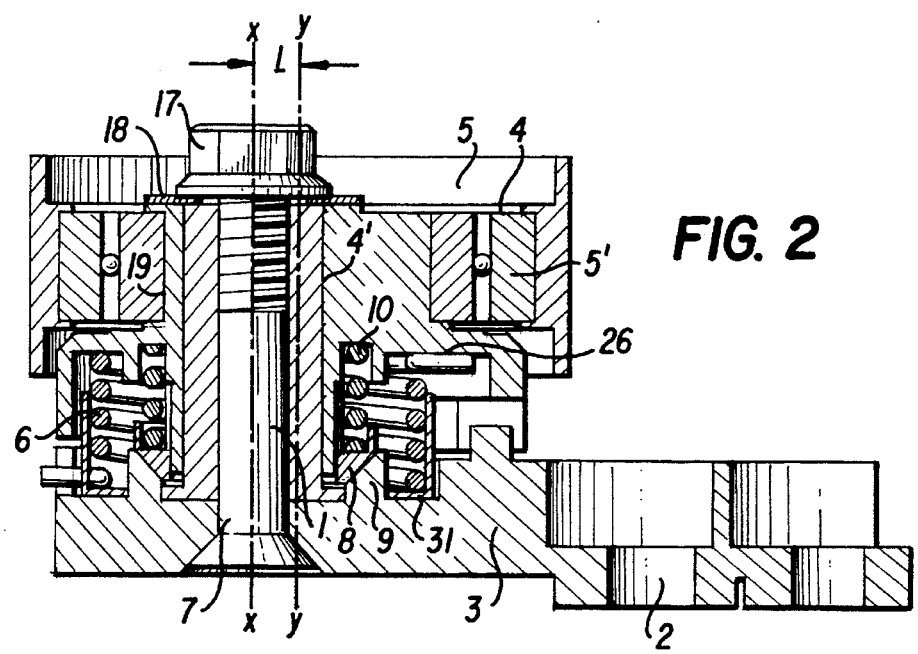
FIG. 2 is an axial sectional view of a tensioner according to the invention.
Figure 4:
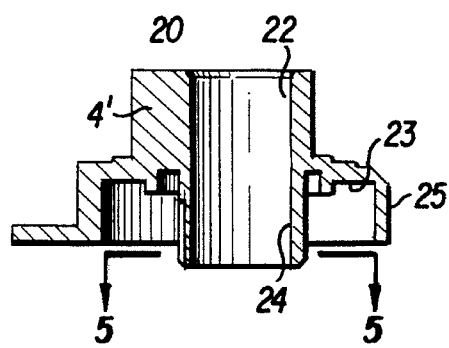
FIG. 4 is an axial sectional view of the arm of the tensioner of FIG. 2.
Figure 5:
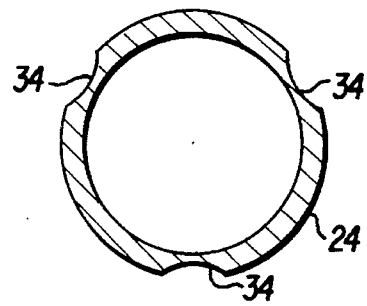
FIG. 5 is a cross sectional view of the shank of the arm of FIG. 4 taken on line V—V of FIG. 4 but at a larger scale.

The tensioner 1 shown in FIG. 2 comprises a stationary structure 3, a lever arm 4, preferably of aluminum, carried by the stationary structure, a pulley 5 associated with the arm, a torsion spring (first spring means) 6 between the stationary structure and the arm to move the arm relative to the stationary structure, frictional dampening means associated with the stationary structure and the arm to dampen the movements of the arm rotating in both rotation directions relative to the stationary structure. A compression spring (second spring means) 10 biases the frictional dampening means and is positioned concentrically inside torsion spring 6.

The stationary structure comprises a shaft 7 having a longitudinal axis mounted in a stationary manner with respect to the movements of the rotating arm. The arm comprises a portion 4' supported by the shaft 7 so as to rotate relative thereto.

The stationary structure 3 is also anchored to parts of the engine, for instance to the face of the engine through holes 2 inside which appropriate fastening means (not shown) are introduced.

The dampening means comprise a pair of annular elements provided with conical surfaces 8, 9 and compression spring 10 inside and coaxial to the torsion spring 6. The angle between the cones and the shaft axis can range between 20 and 70 degrees with a commensurate change in the dampening effect (angle β, FIG. 6). In the example of FIG. 2, the angle of the cones with respect to the longitudinal axis of shaft 7 is about 45 degrees.

The whole dampening device is positioned coaxially inside the torsion spring.

In the application to a toothed belt driving device the tensioner makes use of an arm comprising an upper cylindrical portion 4' having its center on axis Y—Y eccentric relative to the axis X—X of the shaft 7.

Pulley 5 is mounted in a freely rotational manner around the cylindrical portion of the arm by interposition of a bearing 5'.

The length values (l) of the arm measured between the centers of the shaft and the pulley and the values of the mean radius (Rm) of the conical surfaces are characteristics of the invention.

It was found that said values must be correlated to each other in a predetermined way to originate, when the arm 4 rotates relative to the stationary structure 3, a frictional dampening between the conical surfaces 8 and 9 is sensibly smaller than the frictional dampening between the shaft and the arm portion carried by the shaft.

To achieve a reduced wear of the material of the cones and a longer lifetime of the tensioner and also maintaining an adequate resistance to cocking, the values of the cited parameters "l" and "Rm" (FIG. 6) are correlated to determine a dampening due to the friction between the cones comprised between 15% and 40% of the total potential dampening due to the friction between shaft and arm portion and dampening device.

In the particular example described, the ratio between the parameter "l" and the mean radius Rm of the conical surfaces is preferably within the range of 0.1 to 0.5 and more preferably equal to about 0.4.

Preferably in absolute the values of "l" in the case of the application of FIG. 1 are between 3 and 7 mm and the values of Rm between 10 and 17 mm.

Moreover it was found particularly adequate in relation to the predetermined parameters "l" and "Rm" to utilize the structural part and the dampening device as described in detail hereinafter.

Figure 3:
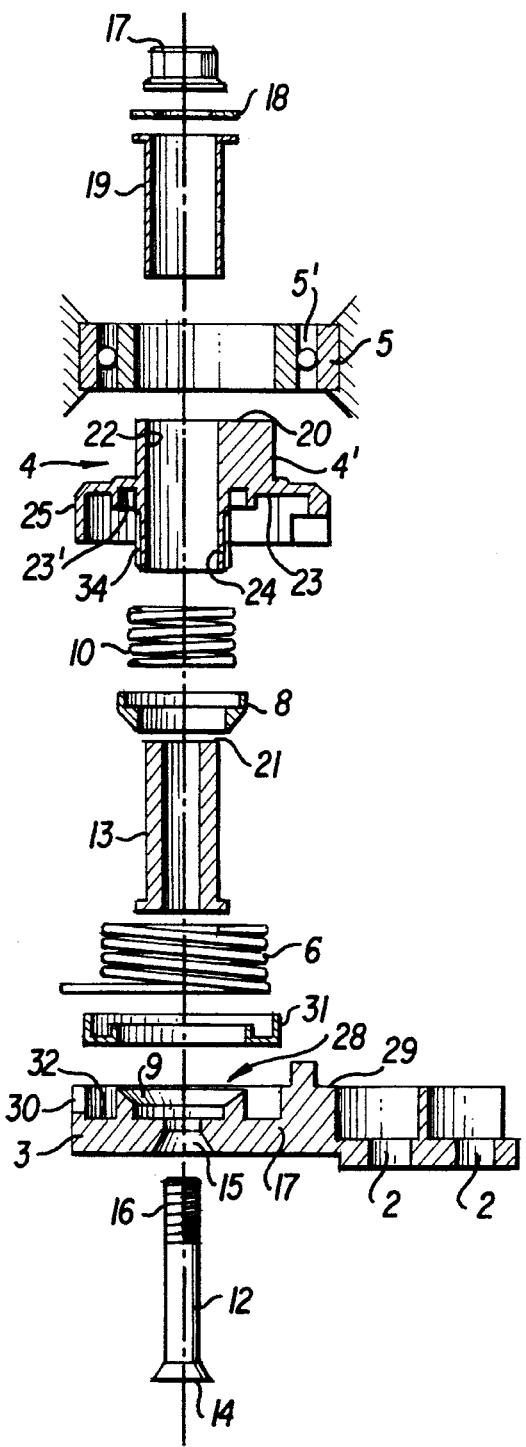
FIG. 3 is an axial exploded view of the parts of the tensioner of FIG. 2.
Figure 6:
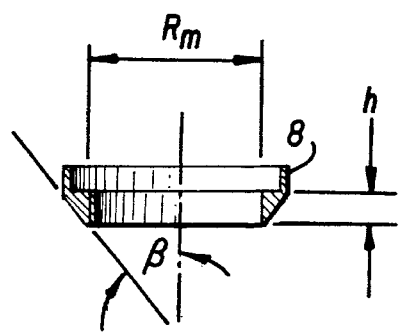
FIG. 6 is a longitudinal sectional view of an annular element of the dampening means of the tensioner and showing angle β.
Figure 7:
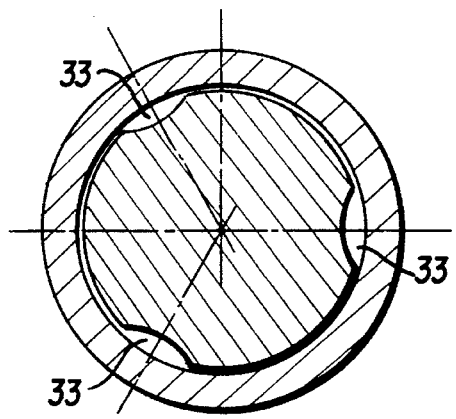
FIG. 7 is a top view of the element of FIG. 6 in enlarged scale.

As clearly visible in FIG. 3, the tensioner 1 comprises a shaft 7 defined by various parts consisting of a pivot 12 and a steel sleeve 13 placed around the pivot. The pivot has a head 14 housed in a seat 15 of the stationary structure and a cylindrical body provided with an end thread 16 projecting towards the inner space of the tensioner. The steel sleeve 13 has its base supported by the stationary structure with which it is integral through a nut 17 screwed on the end thread 16 of the pivot 16 so as to press through a flange 18 on the upper end of the sleeve 13.

Between the arm and the sleeve and between the arm upper end 20 and the flange 18 there is a tubular layer 19 of anti-friction material, for instance said layer is constituted by a bronze mesh impregnated in particular with plastic material and for example with polytetrafluoroethylene. The arm 4, advantageously formed in a single piece, comprises various parts to perform different tasks.

In particular the arm 4 comprises:

a tubular member 22 to be mounted around the shaft;

an upper full cylinder 4' arranged in an eccentric manner relative to the axis of the tubular member and extending between two bases, an upper base 20 and a lower base 23, respectively, for a short length with regards the tubular member; the pulley 5 with its bearing 5' is applied on said cylindrical portion 4—4';

a sectional reduction from the periphery of the lower base of the arm extends towards the center of the tubular member to form a shank 24 extending along the remaining part of the tubular member; said shank is useful both to increase the area of contact with the anti-friction layer around the sleeve and to form, as it will be explained later, some guide grooves for the annular element 8 preserving the shaft 7 from incidental notches for the same purpose;

a lateral cylindrical wall 25 extending in a projecting manner from the periphery of the lower base 23 as far as a minimum distance with respect to corresponding lateral walls of the stationary structure; said wall is useful to enclose the damping device preserving it from any dust coming from outside;

a hole 26 (FIG. 1) is in the lateral wall 25 to receive one end of the torsion spring 6.

Very advantageously the shank 24 extends towards the stationary structure without contact with adjacent parts. This permits fittings of the length of the tubular member in presence of thermal expansions avoiding therefore the risk of a contact between the lower end of the shank and the stationary structure with a consequent risk of blocking the rotation of the arm caused by the torsion spring 6 acting to tension the belt.

In one embodiment of the present invention now described, the steel sleeve 13 has an outer diameter of about 16 mm and the length of the tubular member 22 is about 32 mm. In accordance with one embodiment of the invention the friction coefficient between sleeve 13 and layer 19 is about 0.12 and that between layer 19 and arm is about 0.20 so that the torsion spring 6 can pull the layer 19 into rotation.

The stationary structure comprises a base 27 in which a cavity 28 is formed. Said cavity 28 is delimited by a cylindrical lateral wall 29 projecting towards a corresponding lateral wall of the lever arm; therefore the lateral walls of the arm and of the stationary structure form the previously mentioned substantially closed cylindrical space where the springs and the dampening device are arranged.

The cavity 28 forms a supporting and fastening seat of the element comprising the second conical surface 9 of the dampening means.

In the embodiment of FIG. 3 the cavity is shaped in such a way that the material of the base 27 is the same material as the annular element having the conical surface 9.

The lateral wall of the cavity 28 on the base 27 has a hole 30 wherein one end of the torsion spring 6 is fixed.

Further, a plastic annular crown 31 is preferably on the base 27, said plastic annular crown being arranged coaxially to the annular element having the conical surface 9 to form a support for the end of the torsion spring 6.

Alternatively, it is possible to utilize a single plastic unit shaped in a way corresponding both to the annular element having the conical surface and the crown for supporting the helical spring; said unit is force fitted into a corresponding cavity in the base material.

A further particular characteristic of the invention is given by the embodiment of the dampening device as pointed out in detail in FIGS. 4 to 7.

As seen in said figures, the element comprising the first conical surface which is applied around the cylindrical shank 24 of the arm and between the arm and the shank there are means for connection to the rotation of the element together with the shank and means to guide the axial movement of the element itself in respect to the second conical surface.

The connecting and guiding means comprise teeth 33 extending radially from the inner annular surface of the annular element towards the shaft and grooves 34 in a number corresponding to the teeth on the outer surface of the shank; the grooves 34 are formed and extend in the axial direction of the shank.

The annular element 8 inserted together with the teeth 33 in the grooves 34 is urged with a pressure against the element having the conical surface 9 by the compression spring 10 arranged coaxially to the shaft 7, inside the torsion spring 6 and with one end in contact with a seat 23' of the arm lower base 23.

Very advantageously, the annular element having a conical surface 8 is made of a brass and bronze alloy and the annular element having the conical surface 9 is of plastic material.

According to some embodiments the annular element having a conical surface has a height h (FIG. 6) of between 2 and 20 mm, preferably between 3 and 10 mm, and a radius Rm between 10 and 17.5 mm.

According to one embodiment of the invention the friction coefficient between the cones 8 and 9 is equal to 0.20 and the compression spring 10 exerts on the cones an axial force of 30N (Newton).

According to one application of the tensioner the force that the belt exerts on the tensioner arm is about 200N.

The just described tensioner operates as follows.

In presence of pulsating forces, for instance the oscillating forces produced by the springs of the valves of the camshafts, a variation of the force transmitted by the belt to the pulley of the tensioner takes place with a consequent balancing reaction of equal value on the shaft. The arm tends to rotate finding an obstacle in the friction generation that arises between the surfaces of contact in the relative rotary motion of the shaft and the portion of the arm around the shaft: consequently a first dampening action takes place.

At the same time the conical surface 8 carried by the arm 4 and integral therewith through the connection between the teeth 33 and the grooves 34, is obliged to rotate, remaining subjected to the action of the compression spring 10 that urges it with a pressure against the opposite conical surface 9; in such a way a friction is generated between the conical parts coaxial to the shaft together with a dampening action.

The two cited dampenings together impede the tensioner pulley 5 to move away and gives rise to the risk of an incidental skipping phenomenon from the grooves of the driving and driven pulleys on the toothed belt.

The solution of the present invention achieves the previously established objects of the invention through the values cited in the description of the distance "l" between the centers of the pulley and the shaft 7 and those of the mean radius "Rm" of the cones, as well as through the values of their ratio.

In fact, it was found that with equal force transmitted by the belt towards the pulley, equal compression load of the spring 10 on the cones, equal angle of the cones, same materials, the force that must be applied on the arm to overcome the friction on the shaft increases with decreasing values of the arm "l" and the force that must be applied by the belt on the arm to overcome the friction of the cones decreases on decreasing the mean radii of the cones, so that establishing the value "l" then it is possible to control the ratio "l" on "Rm" so as to obtain the desired dampening ascribing however the maximum part to the friction between the shaft and the arm and reducing that of the cones. In such a way a reduction of the wear of the materials of the cones is obtained and their capability of withstanding "cocking" is maintained unchanged in time.

As regards the predetermined value "l", it was found that it is function of various geometric parameters as the value of the angle alpha (FIG. 1) assumed by the belt on the tensioner pulley, the belt length, the belt materials, the supporting materials of the driving and driven pulleys as for instance the base and the engine head.

The value of "l" is also a function of physical parameters, such as the elongation of the belt in time as a function of the wear, and the modulus of elasticity of the belt.

In particular the expansions to which the whole system is subject determines a variation of the belt development which is balanced by the movement of the pulley of the present tensioner.

It was found that the value "l" of the arm can range between 3 and 7 mm.

For example, it was found that the minimum value "l" of the arm to maintain constant tension values in the belt branches is about 5 mm in the case of a belt having a circumferential length of 1200 mm, an angle alpha of 70 degrees, an engine of aluminum, a permanent elongation of the belt of 0.1%, a variation of temperature comprised between −30 degrees and +130 degrees celsius.

In particular it is pointed out that the dampening due to the friction between the shaft and the portion of the arm can determine a certain wear of the anti-friction material interposed therebetween, but thanks to the characteristic of the shaft surrounded by a tubular member extending in practice for the whole length of the shaft, a specific pressure takes place which has such a value to limit considerably the wear phenomena.

Also it is understood that the invention is not strictly limited to what is previously described, but it includes also all those solutions and alternative expedients, even if not explicitly described here, but easily deducible by anyone skilled in the art on the basis of the present inventive idea.

We claim:

1. A tensioner for driving belts comprising a stationary structure, a lever arm supported by said stationary structure and movable relative to said stationary structure, a pulley associated with the arm, first mechanical spring means associated with the stationary structure and the arm to move the arm with respect to the stationary structure and to urge the pulley against the belt, frictional dampening means associated with the stationary structure and the arm to dampen movements of the arm rotating relative to the stationary structure in both directions of rotation, said stationary structure comprising a shaft having a longitudinal axis and being mounted in a stationary manner relative to the movements of the rotating arm, said arm having a portion supported by said shaft so as to rotate with respect to said shaft, said tensioner further comprising:
   a) said dampening means comprising first and second annular elements each having conical surfaces, second mechanical spring means, said first conical surface comprising frictional means and being mounted coaxially to the shaft and movable axially with respect thereto and against the second conical surface, said second spring means biasing the first and second conical surfaces against each other into contact under pressure, said first and second conical surfaces having a mean radius smaller than the maximum radial dimension of the first mechanical spring means;
   b) the length value l of the arm measured between the centers of the shaft and the pulley and the mean radius value Rm of the conical surfaces are correlated in a predetermined manner to produce, when the arm rotates relative to the stationary structure, a frictional dampening between the first and second conical surfaces which is smaller than the frictional dampening occurring between the shaft and the portion of arm carried by the shaft.

2. A tensioner as in claim 1 in which the ratio between the arm length l and the mean radius Rm of the conical surfaces is between 0.1 and 0.5.

3. A tensioner as in claim 1 in which said arm comprises a cylinder mounted in an eccentric manner relative to the longitudinal axis of the shaft, said pulley being freely rotational mounted on said cylinder through interposition of a bearing.

4. A tensioner as in claim 1 in which in an axial section of the tensioner, the angle β between the line of the conical surface in the axial plane and the longitudinal axis of the shaft is between 20 and 70 degrees.

5. A tensioner as in claim 1 in which said first conical surface rotates with the lever arm.

6. A tensioner as in claim 5 comprising connection means which permits rotation of and guiding of axial movement between the first conical surface and the arm.

7. A tensioner as in claim 1 in which the first conical surface is associated with the stationary structure and the second conical surface is associated with the arm.

8. A tensioner as in claim 7 comprising means for connection to the stationary structure while permitting axial movement relative to the shaft.

9. A tensioner as in claim 1 in which said arm rotating around the shaft comprises a first full cylindrical portion followed by a shank lower end having a smaller thickness and extending as far as the stationary structure without contact between the shank lower end and said structure.

10. A tensioner as in claim 9 in which said shaft comprises a pivot and a metallic sleeve around the pivot, said pivot having a head housed in a seat of the stationary structure and a cylindrical body having an end thread projecting through the tensioner, said metallic sleeve having a base supported by the stationary structure and being integral with the stationary structure through a nut screwed on the end thread so as to be secured to the stationary structure.

11. A tensioner as in claim 10 comprising a layer of antifriction material between the arm and the sleeve and between the upper end of the arm and said flange.

12. A tensioner as in claim 1 in which said first conical surface is mounted around a cylindrical shank of the arm and between the first conical surface and the shank there are means for connection and guiding of rotation of the shank and to permit axial movement of the first conical surface relative to the second conical surface arranged on the stationary structure.

13. A tensioner as in claim 12 in which said connecting and guiding means comprises teeth extending radially from the inner surface of the annular element towards the shaft and grooves corresponding to the teeth and on the outer surface of the shank, said grooves being formed in an axial direction of the shank.

14. A tensioner as in claim 12 in which between the arm and an element carrying the first conical surface said second mechanical spring means in the form of a helical compression spring is mounted coaxially to the shaft, said helical compression spring acting between a shank base extended transversely of the longitudinal axis of the shaft and a supporting surface of the first conical surface.

15. A tensioner as in claim 1 in which:
   said arm comprises a tubular member around the shaft;
   an upper full cylinder arranged with its axis eccentric relative to an axis of the tubular member, said upper full cylinder extending between upper and lower bases, respectively, for a length shorter than a length of the tubular member;
   a shank of reduced diameter extending from the periphery of the lower base of the arm towards the center of the tubular member;
   a lateral cylindrical wall of greater diameter than said shank and projecting from the periphery of the lower base toward corresponding lateral walls projecting from the stationary structure; a hole in the lateral wall to receive one end of said first mechanical spring means;

said lever arm having said eccentric portion forming a housing for the pulley through interposition of a bearing and said shank having longitudinal grooves to receive corresponding teeth of an annular element comprising said first conical surface.

16. A tensioner as in claim 1 in which said stationary structure comprises a base where a cavity is formed and which is delimited by a lateral cylindrical wall projecting towards a corresponding lateral wall of the lever arm, lateral cylindrical walls of the arm and of the stationary structure forming a cylindrical space substantially closed wherein the said first and second spring means are disposed, said cavity forming a supporting and fastening housing of an element comprising said second conical surface, the said lateral cylindrical wall of the cavity on the base including a hole in which one end of the first mechanical spring means is fixed.

17. A tensioner as in claim 15 in which said first mechanical spring means comprises a helical spring having end turns which lie on a base of the cavity and the lower base of the arm.

18. A tensioner as in claim 16 in which said second mechanical spring means comprises a compression spring disposed between a groove on the lower base of the arm and an annular element comprising the first conical surface, said compression spring being mounted coaxially to the shaft and inside said first mechanical spring means which is a torsion spring between the lower base of the arm and the cavity of the stationary structure, with the end turns of the first spring means being inserted in said holes of the arm and the stationary structure.

19. A tensioner as in claim 16 comprising a plastic unit formed with (a) a first part shaped to fit with an annular element provided with the second conical surface and (b) a second part shaped as an annular crown to fit between the walls of said annular element and an outer cylindrical lateral wall defining a supporting housing for said first mechanical spring means which is formed as a helical torsion spring acting between the arm and the stationary structure, the dimensions of said plastic unit corresponding to those of the cavity of the base.

20. A tensioner as in claim 1 in which the second conical surface of the dampening means is a portion of the stationary structure.

21. A tensioner as in claim 1 in which said annular element comprising the first conical surface is made of a bronze alloy.

* * * * *

UNITED STATES PATENT AND TRADEMARK OFFICE
CERTIFICATE OF CORRECTION

PATENT NO. : 5,620,385
DATED : April 15, 1997
INVENTOR(S) : Cascionale et al

It is certified that error appears in the above-indentified patent and that said Letters Patent is hereby corrected as shown below:

Line [30], change "MI9402215" to --MI94A02215--.

Signed and Sealed this

Tenth Day of March, 1998

Attest:

BRUCE LEHMAN

Attesting Officer

Commissioner of Patents and Trademarks